Patented May 31, 1932

1,860,562

UNITED STATES PATENT OFFICE

TRUMAN B. WAYNE, OF HOUSTON, TEXAS

PROCESS OF BREAKING PETROLEUM EMULSIONS

No Drawing.    Application filed May 21, 1931. Serial No. 539,126.

This invention relates to a process of breaking petroleum emulsions of the character commonly encountered in the production, handling and refining of petroleum.

The principal object of this invention is to provide an improved process and reagents for treating petroleum emulsions to separate them into their component parts of oil and water.

In its broad aspect, the present process consists in subjecting petroleum emulsions of the water-in-oil type to the action of an amide of an aromatic sulfonic acid. More particularly, it relates to the employment as resolving agents of amino or imino derivatives of nuclear-substituted aromatic sulfonic acids prepared by condensing aromatic sulfonic acids which have been substituted in the nuclei by one or more organic residues from aldehydes, ketones, alcohols, fatty acids and the like, with aromatic amines which are characterized by having their amino or imino groups attached directly to the benzene nucleus.

Substituted aromatic sulfonic acids and their salts with alkalis and ammonia have come into relatively broad use as wetting agents in the textile and related industries. Moreover, patents have recently been granted covering the use of these acids and their salts as dehydrating agents for petroleum emulsions. In my copending application Serial No. 466,360 filed July 7, 1930, I disclose the use of side-chain aromatic sulfonic acids condensed with secondary, tertiary, and quaternary organic bases as resolving agents for the treatment of petroleum emulsions.

I have now found that a marked improvement in the demulsifying properties of these side-chain aromatic sulfonic acids can be effected by condensing them with aromatic amines, and their substituted derivatives, which are characterized by having the amino or imino group attached to the benzene nucleus. Aromatic amines which have the $NH_2$ group in the side-chain, and those which have been substituted with alkyl groups, are stronger bases than the amines having the amino or imino group attached to the benzene nucleus, resembling more closely the aliphatic amines, and are not suitable for the preparation of treating agents of the character contemplated in the present invention. The use of products of the latter type in the treatment of petroleum emulsions are claimed in my copending application referred to above.

In the preferred practice of the present invention a nuclear-substituted or side-chain aromatic sulfonic acid is condensed with a primary aromatic amine in which the $NH_2$ group is attached to the aromatic nucleus. The resulting product is particularly effective in the breaking of petroleum emulsions. I attribute the marked demulsifying action of the new treating agent to the great increase in colloidality obtained by condensing the aromatic sulfonic acids with the aromatic amines. For example, the alkyl-substituted naphthalene sulfonic acids are characterized by being completely soluble in water after being freed from excess mineral acid, whereas my new treating agent of the character referred to produces a very stable, milky, colloidal suspension in water, in which the colloidal material is in a very high state of dispersion. Furthermore, it is more easily dispersed in mineral oils than are the unaltered side-chain aromatic sulfonic acids and their salts. In fact, this new treating agent is appreciably soluble in both water and mineral oil, which fact materially assists its penetration through the emulsion to the water-in-oil-interfaces.

In the production of the new treating agents contemplated by the present invention, I prefer to prepare the side-chain aromatic sulfonic acids by any of the conventional methods involving the substitution of alkyl, aryl, aralkyl, or cyclo-alkyl radicals and one or more sulfonic groups into the aromatic nucleus, either separately or simultaneously by the use of condensing and sulfonating agents. Moreover, petroleum sulfonic acids and their alkyl substituted derivatives are also suitable for my purpose. The sulfonic derivatives employed are condensed with from 2 to 10 per cent. by weight of an aromatic amine which has its amino or imino group attached directly to the benzene nucleus. In preferred practice aniline or toluidine is employed as the aromatic amine in the preparation of the highly colloidal treating agent disclosed herein.

Although it is to be understood that the invention is not limited thereto, the following specific example of one method of preparing my improved treating agent may be considered as illustrative of the invention:

1,000 parts of 98 per cent. sulfuric acid are run into a jacketed reaction kettle and heated to approximately 160° C. Thereafter, 500 parts of melted naphthalene are slowly run into the acid and the temperature is raised to approximately 180° C. for about two to three hours until the naphthalene has become intensively sulfonated, possibly through the substitution of two or three sulfonic groups.

800 parts of 98 per cent. sulfuric acid are slowly run into a coil-equipped reaction vessel containing 500 parts of normal butyl alcohol while the temperature is kept below 85° C. The acid butyl sulfate so formed is then added to the naphthalene sulfonic acid, previously cooled to about 100° C. to 125° C., over a period of two hours, and the heating is continued over an additional three hours, if necessary, to complete the alkylation.

After the reaction is complete, the acid mass is cautiously diluted with water until an upper layer separates. This is then drawn off and, while agitating vigorously by means of a strongly constructed agitator, 100 parts of aniline oil are slowly added. Condensation occurs instantaneously.

The acid mass may be again washed, if desired, by diluting it with water and allowing it to stand for several hours, as the highly colloidal mass readily separates from an excess of water even after receiving the primary washing before the final condensation with aniline.

The upper layer is drawn off and may be used as such in the treatment of petroleum emulsions, or it may be cautiously neutralized with ammonia or a strongly basic water-soluble amine such, for example, as trimethylamine or triethanolamine, while cooling to prevent too great a rise in temperature during neutralization and the formation of insoluble condensation products.

I prefer to employ the unneutralized colloidal mass as it has been found to be practically noncorrosive in aqueous solutions, this possibly being due to its high colloidality which has a protective or "buffer" effect in preventing excessive hydrolysis of the acid groups. This function may be quite similar to that of commercial "inhibitors" prepared from complex organic condensation products.

In the preparation of my improved treating agent, the colloidality of the compound in aqueous solution is controlled by the amount of primary amine used in its preparation. If very little or no amine is used, the side-chain sulfonic acid will provide a clear aqueous solution and will not readily disperse in mineral oil. However, as the proportion of amine is increased up to a maximum in the neighborhood of 10 per cent. of the weight of sulfonic acid used, the colloidality of the finished treating agents in water solutions increases as does its solubility in mineral oil. The use of excessive amounts of the amine is not desirable as the finished product is then insoluble in water and may form crystalline compounds. However, its solubility in mineral oil increases with the percentage of amine used which may possibly be advantageous in special cases. However, my broad idea contemplates the use of only sufficient amine to form treating agents possessing high colloidality in water solutions and sufficient solubility in oil to render it readily miscible with the latter.

Inclusive in the term "nuclear-substituted" or "side-chain" aromatic sulfonic acids are alkyl, aryl, and aralkyl nuclear-substituted sulfonic acids of the aromatic series prepared by substituting aliphatic or aromatic residues from the corresponding aldehydes, ketones, alcohols, halogen derivatives and the like, and also fatty residues of saturated and unsaturated acids having more than three carbon atoms. The aromatic compounds employed may be mono- or poly- cyclic compounds and their various hydroxy, chloro, nitro, and carboxylic derivatives.

As stated above, the amines used are preferably primary amines such as aniline or toluidine, although secondary amines, such as diphenyl amine, and other amines which are characterized by having their $NH_2$ or NH groups attached directly to the benzene nucleus, may be also used. However, commercial aniline oil is readily available in commercial quantities at prices allowing its use, and is preferred in the practice of the present invention. The other aromatic amines having $NH_2$, NH, etc. groups in the side-chain and the aliphatic amines are specifically excluded from the scope of the present invention, since salts of these prepared from side-chain aromatic sulfonic acids have entirely different properties in many respects from the treating agents contemplated by the present invention.

The improved resolving agents hereinbefore described are employed in the proportion of one part of the reagent to from 2,000 to 20,000 parts of petroleum emulsion, either by adding the concentrated product directly to the emulsion or after diluting with water or oil in the conventional manner. The reagents may be used in any of the numerous ways or usual apparatus commonly employed in the treatment of petroleum emulsions.

While I have described in detail the preferred embodiment of my invention it is to be understood that the materials employed, the proportions of ingredients, the arrangement of steps and the details of procedure may be variously modified without departing from the spirit of the invention or the scope of the subjoined claims.

I claim:

1. The process of breaking water-in-oil emulsions which comprises adding thereto the condensation product of an aromatic amine and an aromatic sulfonic acid.

2. The process of breaking water-in-oil emulsions which comprises adding thereto the condensation product of an aromatic amine and a nuclear-substituted aromatic sulfonic acid.

3. The process of breaking water-in-oil emulsions which comprises adding thereto the condensation product of an aromatic amine and an aromatic sulfonic acid which has been substituted in the aromatic nucleus by one or more residues from the group comprising alkyl, aryl, aralkyl, and cyclo-alkyl groups and residues of fatty acids containing more than three carbon atoms.

4. The process of breaking water-in-oil emulsions which comprises adding thereto a highly colloidal treating agent resulting from condensing an aromatic sulfonic acid with an aromatic amine which is characterized by having its $NH_2$ or NH group attached directly to the aromatic nucleus.

5. The process of breaking water-in-oil emulsions which comprises adding thereto a highly colloidal treating agent resulting from condensing a nuclear-substituted aromatic sulfonic acid with an aromatic amine which is characterized by having its $NH_2$ or NH group attached directly to the aromatic nucleus.

6. The process of breaking water-in-oil emulsions which comprises adding thereto the condensation product of an aromatic sulfonic acid with primary aromatic amine characterized by having its $NH_2$ group attached directly to the aromatic nucleus.

7. The process of breaking water-in-oil emulsions which comprises adding thereto the condensation product of an aromatic sulfonic acid and a secondary aromatic amine which is characterized by having its NH group attached directly to the aromatic nucleus.

8. The process of breaking water-in-oil emulsions which comprises adding thereto a highly colloidal condensation product resulting from condensing an aromatic sulfonic acid containing one or more sulfo groups, or a nuclear-substituted derivative thereof, with from 2 to 10 per cent. by weight of a primary aromatic amine characterized by having its $NH_2$ group attached directly to the aromatic nucleus.

9. The process of breaking water-in-oil emulsions which comprises adding thereto a highly colloidal treating agent prepared by condensing an aromatic sulfonic acid containing one or more sulfo groups, or a nuclear-substituted derivative thereof, with from 2 to 10 per cent. by weight of a secondary aromatic amine characterized by having its NH group attached directly to the aromatic nucleus.

10. The process of breaking water-in-oil emulsions which comprises adding thereto a highly colloidal condensation product of dialkyl-naphthalene disulfonic acid and an aromatic amine characterized by having its $NH_2$ or NH group attached directly to the aromatic nucleus.

11. The process of breaking water-in-oil emulsions which comprises adding thereto a highly colloidal condensation product of dialkyl-naphthalene disulfonic acid and aniline.

12. The process of breaking water-in-oil emulsions which comprises adding thereto a highly colloidal condensation product of dialkyl-naphthalene disulfonic acid and toluidine.

13. The process of breaking water-in-oil emulsions which comprises adding thereto a highly colloidal condensation product of dialkyl-naphthalene disulfonic acid and diphenylamine.

In testimony whereof I affix my signature.

TRUMAN B. WAYNE.